United States Patent
Kim et al.

(10) Patent No.: US 9,047,679 B2
(45) Date of Patent: Jun. 2, 2015

(54) METHOD AND DEVICE FOR PROCESSING AN IMAGE TO REMOVE COLOR FRINGE

(71) Applicants: SAMSUNG ELECTRONICS CO., LTD., Suwon-Si, Gyeonggi-Do (KR); INDUSTRY-UNIVERSITY COOPERATION FOUNDATION SOGANG UNIVERSITY, Seoul (KR)

(72) Inventors: Tae Chan Kim, Yongin-Si (KR); Won Ho Cho, Suwon-Si (KR); Hae Jin Ju, Seoul (KR); Rae Hong Park, Seoul (KR); Dong Kyu Lee, Seoul (KR)

(73) Assignees: SAMSUNG ELECTRONICS CO., LTD., Suwon-Si, Gyeonggi-Do (KR); INDUSTRY-UNIVERSITY COOPERATION FOUNDATION SOGANG UNIVERSITY, Seoul (KR)

( * ) Notice: Subject to any disclaimer, the term of this patent is extended or adjusted under 35 U.S.C. 154(b) by 136 days.

(21) Appl. No.: 13/739,492

(22) Filed: Jan. 11, 2013

(65) Prior Publication Data

US 2014/0193069 A1 Jul. 10, 2014

(30) Foreign Application Priority Data

Jan. 10, 2013 (KR) ........................ 10-2013-0002806

(51) Int. Cl.
*G06K 9/00* (2006.01)
*G06T 5/30* (2006.01)
*G06T 5/00* (2006.01)

(52) U.S. Cl.
CPC . *G06T 5/30* (2013.01); *G06T 5/005* (2013.01); *G06T 2207/10024* (2013.01); *G06T 2207/20192* (2013.01)

(58) Field of Classification Search
CPC ..... H04N 1/40093; H04N 1/58; H04N 5/217; H04N 5/23287; H04N 5/23296; H04N 9/045; H04N 9/622; H04N 9/6288; H04N 9/646; H04N 9/68; H04N 2209/046; G06K 9/00234; G06K 9/00281; G06K 9/00248; G06K 2209/00322; G06T 3/403; G06T 3/4015; G06T 5/003; G06T 5/005; G06T 7/0081; G06T 7/0083; G06T 7/0091; G06T 7/0095; G06T 7/0097; G06T 2200/24; G06T 2207/30201; G06T 2207/10024; G06T 2207/20036; G06T 2207/20064; G06T 2207/20141; G06T 2207/20144; G06T 2207/20148

See application file for complete search history.

(56) References Cited

U.S. PATENT DOCUMENTS 7,630,546 B2 12/2009 Ishiga
7,656,437 B2 2/2010 Yamada et al.
(Continued)

FOREIGN PATENT DOCUMENTS

JP 2009200635 9/2009
JP 2009284009 12/2009
(Continued)

OTHER PUBLICATIONS

Ju et al., "Chromatic Aberration Removal in Narrow Color Regions of Digital Images," Consumer Electronics (ICCE), 2012 IEEE International Conference on Consumer Electronics (ICCE), Jan. 13, 2012.

(Continued)

*Primary Examiner* — Jose Couso
(74) *Attorney, Agent, or Firm* — Volentine & Whitt, PLLC

(57) ABSTRACT

In image processing, a color fringe is removed. The processing includes selecting a maximum gradient magnitude among gradient magnitudes for each of color components in an image, calculating a boundary of a dilated near-saturation region in the image, detecting a transition region in the image according to the maximum gradient magnitude and the dilated near-saturation region, and removing a color fringe from the transition region.

20 Claims, 19 Drawing Sheets

(56) References Cited

U.S. PATENT DOCUMENTS

| | | | |
|---|---|---|---|
| 8,150,154 B2 | 4/2012 | Kang et al. | |
| 8,155,440 B2 | 4/2012 | Terasawa | |
| 8,155,441 B2 | 4/2012 | Sawada et al. | |
| 8,260,078 B2 * | 9/2012 | Kalman | 382/274 |
| 8,280,163 B2 * | 10/2012 | Nobuoka | 382/167 |
| 8,515,171 B2 * | 8/2013 | Vantaram et al. | 382/173 |
| 2010/0303352 A1 | 12/2010 | Nobuoka | |

FOREIGN PATENT DOCUMENTS

| | | |
|---|---|---|
| JP | 4539278 | 7/2010 |
| JP | 2011160204 | 8/2011 |
| JP | 2011205399 | 10/2011 |

OTHER PUBLICATIONS

Ju et al., "Color Fringe Detection and Correction in YCbCr Space," Consumer Electronics (GCCE), 2012 IEEE 1st Global Conference, Oct. 4, 2012.

Ju et al., "Color Fringe Removal in Narrow Color Regions of Digital Images," Signal, Image and Video Processing, Nov. 2012.

* cited by examiner

US 9,047,679 B2

METHOD AND DEVICE FOR PROCESSING AN IMAGE TO REMOVE COLOR FRINGE

CROSS-REFERENCE TO RELATED APPLICATIONS

A claim of priority under 35 U.S.C. §119 is made to Korean Patent Application No. 10-2013-0002806 filed on Jan. 10, 2013, the disclosure of which is hereby incorporated by reference in its entirety.

BACKGROUND

Embodiments of the inventive concept generally relate to image processing, and more particularly, to methods and devices for removing color fringe in a narrow color region of a digital image.

When a digital camera captures a color image of a live scene, a lens of the camera may not focus all colors to a convergence point. As a result, distortion may occur near boundaries of objects in the color image. This distortion is referred to herein as color fringe. Color fringe can become especially problematic as the resolution of the color image is increased or when the digital camera is relied on for detailed imagery.

Generally, color fringe results from chromatic aberration (color distortion) caused by an optical system and by a blooming effect. First, with respect to the optical system, chromatic aberration can result when RGB colors of light are not focused at a single point at the same time through a lens. That is, since the refractive indexes of the RGB colors differ from each other according to a wavelength, components of the three colors passing through a lens may not be focused on the same axis or plane.

Second, with respect to the blooming effect, when a bright color is passed through an image sensor pixel for a continuous amount of time, accumulated charges may overflow into a potential wall. The overflowing charges may transfer to neighboring pixels, thereby causing color artifacts including a near-saturation region.

SUMMARY

An embodiment of the inventive concept is directed to a method for removing a color fringe, including selecting a maximum gradient magnitude among gradient magnitudes for each of color components in an image, calculating a boundary of a dilated near-saturation region in the image, detecting a transition region in the image according to the maximum gradient magnitude and a boundary of the dilated near-saturation region, and removing a color fringe from the transition region. Gradient magnitudes of each of the color components represent the greatest value among gradient magnitudes, which are calculated by using each of vertical, horizontal, diagonal, and anti-diagonal sobel masks, for each of the color components.

According to an example embodiment, a method for removing a color fringe may further include selecting a direction label for at least one of the color components at an arbitrary point of the image. The direction label is used for detecting the transition region.

The direction label is one of v, h, d and ad, and the v means vertical, the h means horizontal, the d means diagonal, and the ad means anti-diagonal. The dilated near-saturation region has a boundary value of 1 in the detected transition region. The maximum gradient magnitude is greater than a threshold value in the sensed transition region.

When each of direction labels for each of the color components is selected, at least two of the direction labels for each of the color components are the same in the detected transition region.

The calculating a boundary of a dilated near-saturation region in the image includes calculating a near-saturation region by comparing a luma component with a threshold value in the image, calculating a dilated near-saturation region by using the near-saturation region and a dilation operation of a structuring element, and calculating a boundary of the expanded near-saturation region using a difference between the near-saturation region and the expanded near-saturation region.

The removing a color fringe from the transition region includes calculating leftmost pixel coordinates and rightmost pixel coordinates in the transition region according to the maximum gradient magnitude, and removing a color fringe from the transition region by using a maximum and a minimum value of color difference at the leftmost pixel coordinates and the rightmost pixel coordinates.

The removing a color fringe from the transition region according to an example embodiment includes calculating the degrees of color fringe occurrence for each color fringe in the transition region, determining a greatest value among the degrees of color fringe occurrence as a color degree, calculating a saturation value by using values of chroma components of the image, calculating weight values of each pixel in the transition region by using the color degree and the saturation value, and correcting the chroma components by using the weight values of each pixel.

Another example embodiment of the inventive concept is directed to an image processing method which includes receiving a digital image signal including color components for each of plural pixels constituting an image frame, selecting a maximum gradient magnitude among gradient magnitudes for each of the color components of the image frame, calculating a boundary of a dilated near-saturation region in the image frame, detecting a transition region in the image frame according to the maximum gradient magnitude and a boundary of the dilated near-saturation region, and generating a processed digital image signal in which a color fringe from the transition region has been removed.

Yet another example embodiment of the inventive concept is directed to an image processor, including a gradient magnitude unit selecting a maximum gradient magnitude among gradient magnitudes of each of color components in an image, a near-saturation region detection unit calculating a boundary of a dilated near-saturation region in an image, a transition region detection unit detecting a transition region in the image according to the maximum gradient magnitude and a boundary of the dilated near-saturation region, and a correction block removing a color fringe from the transition region.

An image processor according to an example embodiment may further include a gradient direction label unit selecting a direction label for at least one of the color components at an arbitrary point of the image.

The correction block calculates leftmost pixel coordinates and rightmost pixel coordinates in the transition region according to the maximum gradient magnitude, and removes a color fringe from the transition region by using a maximum and a minimum value of color difference at the leftmost pixel coordinates and the rightmost pixel coordinates.

The image processor may form part of a system which also includes a main processor, a memory and interface communicating over a bus system. The system may be embodied as at least one of a mobile phone, a smart phone, a tablet PC, a personal digital assistant (PDA), an enterprise digital assistant (EDA), a digital still camera, a digital video camera, a portable multimedia player (PMP), a personal navigation device or portable navigation device (PDN), a smart TV, handheld game console, a security camera, and an e-book.

According to an example embodiment, the correction block calculates the degrees of color fringe occurrence for each color fringe in the transition region, determines a greatest value among the degrees of color fringe occurrence as a color degree, calculates a saturation value by using values of chroma components in the image, calculates weight values of each pixel in the transition region by using the color degree and the saturation value, and corrects the chroma components by using the weight values of each pixel.

BRIEF DESCRIPTION OF THE DRAWINGS

The above and other aspect and features of the inventive concept will become readily apparent from the detailed description that follows, with reference to the accompanying drawing, in which.

DETAILED DESCRIPTION OF THE PREFERRED EMBODIMENTS

Figure 1A:
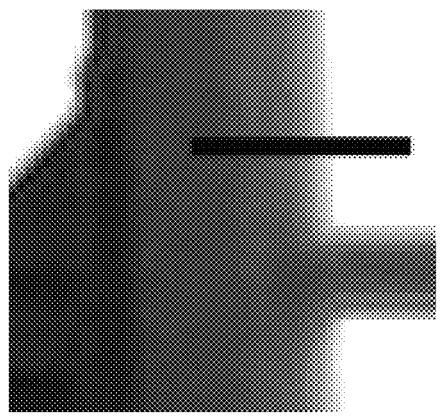
FIG. 1A illustrates a portion of an image including a general fringed region.
Figure 1B:
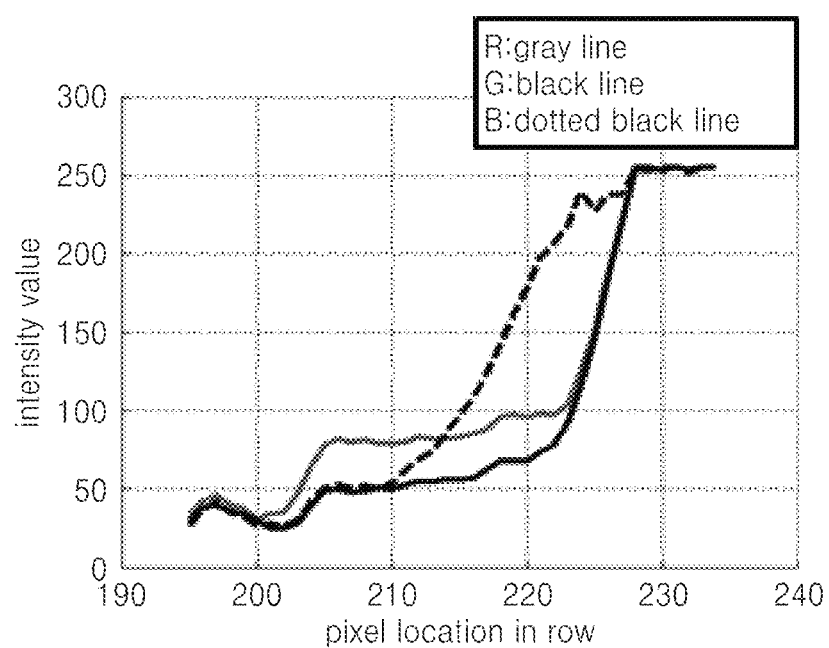
FIG. 1B is a graph depicting an intensity value along a solid black line illustrated in FIG. 1A.

FIG. 1A illustrates a portion of an image including a general fringed region, and FIG. 1B is a graph depicting relative RGB intensity values at row pixel locations along the solid black line illustrated in FIG. 1A.

Referring to FIGS. 1A and 1B, intensity values in a general fringed region change abruptly from one constant value to another value, and an intensity value difference between these constant values is substantial. In a conventional art, such an intensity value difference may be may relied on to detect and remove color fringe within a digital image.

Figure 1C:
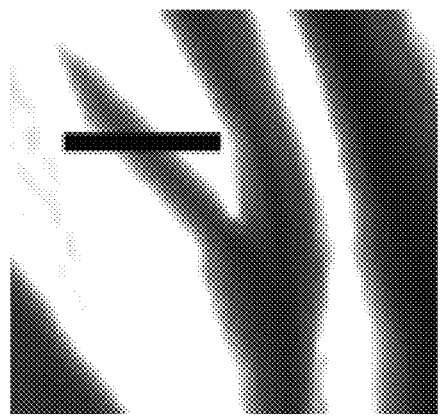
FIG. 1C illustrates a portion of an image including a narrow color region.
Figure 1D:
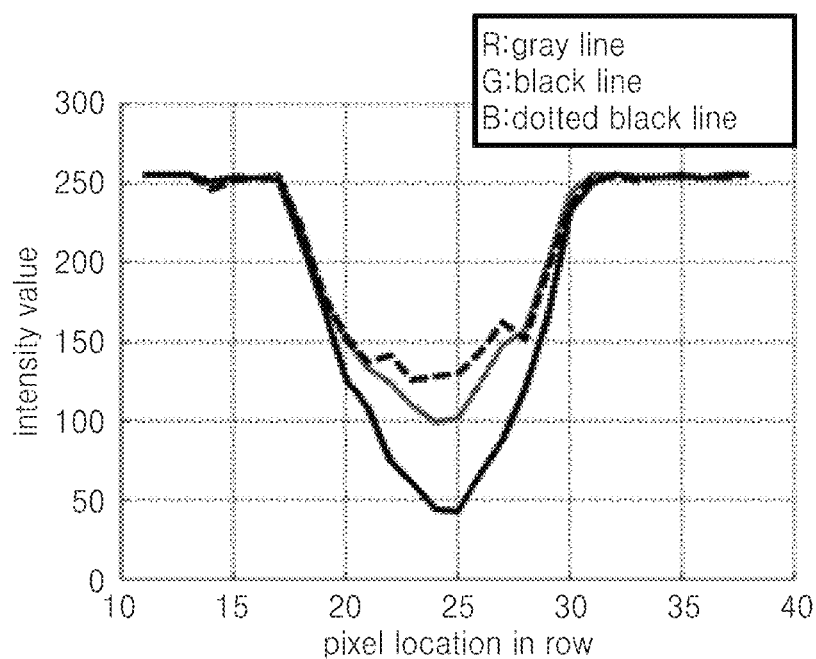
FIG. 1D is a graph depicting an intensity value along a solid black line illustrated in FIG. 1C.

FIG. 1C illustrates an image including a narrow color region, and FIG. 1D is a graph depicting relative RGB intensity values along the solid black line illustrated in FIG. 1C.

Referring to FIGS. 1C and 1D, an intensity value is constant at two pixel regions on opposite sides of pixel region having relatively non-constant intensity values. A narrow color region refers to a case where an intensity value difference between the constant intensity values of the two pixel regions is zero or nearly zero. The previously mentioned conventional art relies on relies on a substantial intensity value difference pixel regions, and thus is not capable of removing color fringe in a narrow color region.

Figure 2:
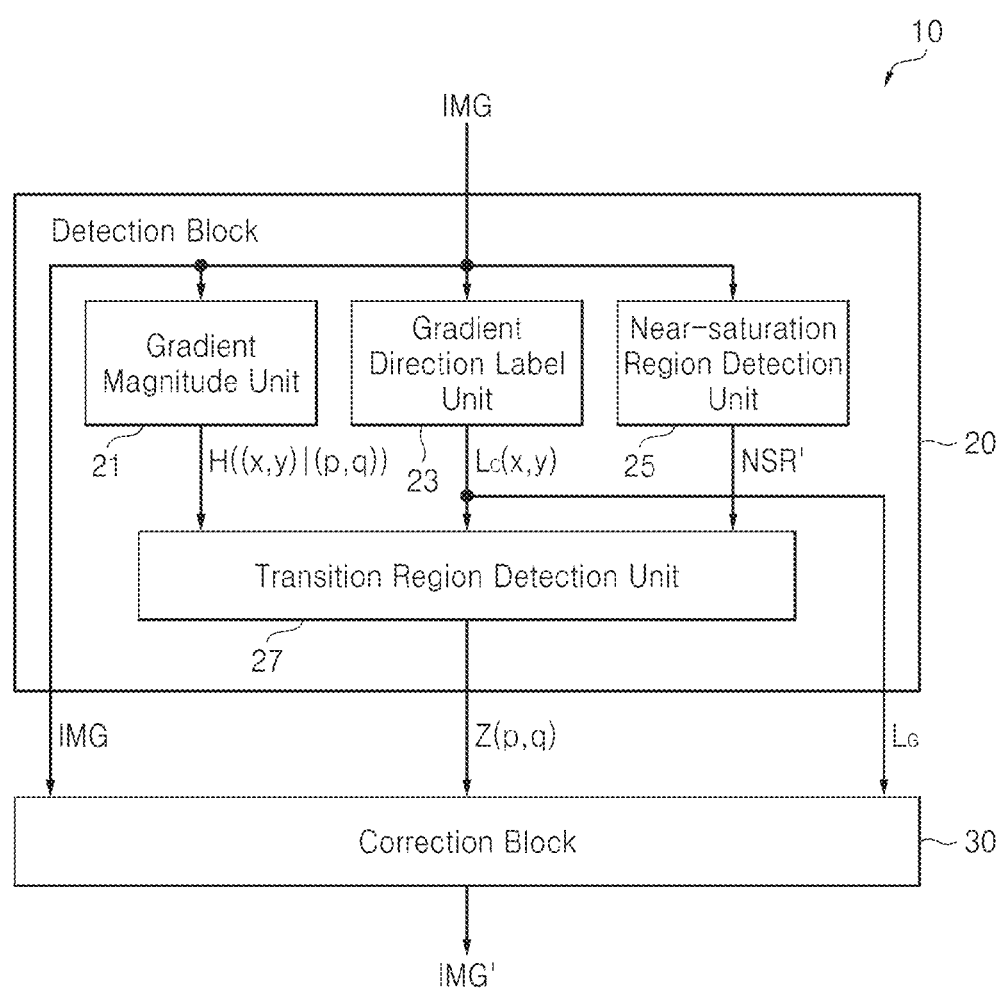
FIG. 2 is a block diagram of an image processor according to an example embodiment of the inventive concept.

FIG. 2 is a block diagram of an image processor according to an example embodiment of the inventive concept. Referring to FIG. 2, an image signal processor 10 detects a transition region in an image IMG after receiving the image IMG, and removes (corrects) a color fringe in a detected transition region. A transition region is a pixel region where pixel intensity values rapidly change, and is also a candidate region of a color fringe. Also, the image IMG may include a narrow color region.

The image signal processor 10 includes a detection block 20 and a correction block 30. Each block 20 and 30 may be embodied in software, hardware, or a combination of software and hardware. According to this example embodiment, each block 20 and 30 is embodied in hardware.

The detection block 20 includes a gradient magnitude unit 21, a gradient direction label unit 23, a near-saturation region detection unit 25, and a transition region detection unit 27.

An image IMG includes color components. The color components of the example of this embodiment are RGB components. The RGB components are included in a RGB color space. According to an example embodiment, RGB components in an image IMG may be converted into $YC_bC_r$ components. The $YC_bC_r$ components are included in a $YC_bC_r$ color space. The conversion is performed by the image signal processor 10. This may be represented as shown in equation 1.

$$\begin{bmatrix} Y \\ C_b \\ C_r \end{bmatrix} = \begin{bmatrix} 65.481 & 128.553 & 24.966 \\ -37.797 & -74.203 & 112.0 \\ 112.0 & -98.786 & -18.214 \end{bmatrix} \begin{bmatrix} R \\ G \\ B \end{bmatrix} + \begin{bmatrix} 16 \\ 128 \\ 128 \end{bmatrix} \quad \text{Equation 1}$$

The Y is a luma component, and $C_b$ and $C_r$ are blue difference and red difference chroma components, respectively.

A gradient magnitude unit 21 determines an initial point (p, q) in a transition region by comparing a gradient magnitude of a G component with an edge threshold value. When a gradient magnitude of a component G is greater than an edge threshold value, an initial point (p, q) in a transition region is determined.

According to an example embodiment, the gradient magnitude unit 21 may determine an initial point (p, q) in a transition region by comparing a gradient magnitude of a Y component with an edge threshold value.

The gradient magnitude unit 21 calculates a maximum magnitude (or value) among gradient magnitudes (or values) of four directions, i.e., vertical, horizontal, diagonal and anti-diagonal, at an initial point (p, q). The gradient magnitude unit 21 calculates a maximum magnitude for each of RGB components. This may be represented as shown in equation 2.

$$E_C(x,y) = \max\{|E_{Cv}(x,y)|, |E_{Ch}(x,y)|, |E_{Cd}(x,y)|, |E_{Cad}(x,y)|\}$$  Equation 2

$|E_{Cv}(x,y)|$, $|E_{Ch}(x,y)|$, $|E_{Cd}(x,y)|$, and $|E_{Cad}(x,y)|$ are gradient magnitudes calculated by using vertical v, horizontal h, diagonal d, and anti-diagonal ad sobel masks, respectively. C represents a component R, a component G or a component B. $E_c(x, y)$ has a maximum magnitude among $|E_{Cv}(x,y)|$, $|E_{Ch}(x,y)|$, $|E_{Cd}(x,y)|$, and $|E_{Cad}(x,y)|$.

According to an example embodiment, when RGB components are converted into $YC_bC_r$ components, the gradient magnitude unit 21 may calculate a maximum magnitude among gradient magnitudes of four directions, i.e., vertical, horizontal, diagonal and anti-diagonal, by using equation 3 at an initial point (p, q).

$$E_Y^o(x,y) = \max\{|E_Y^v(x,y)|, |E_Y^h(x,y)|, |E_Y^d(x,y)|, |E_Y^{ad}(x,y)|\}$$  Equation 3

$|E_Y^v(x,y)|$, $|E_Y^h(x,y)|$, $|E_Y^d(x,y)|$, and $|E_Y^{ad}(x,y)|$ are gradient magnitudes calculated by using vertical v, horizontal h, diagonal d and anti-diagonal ad sobel masks, respectively. Y represents a luma component. A chroma component $C_b$ or $C_r$ may be used instead of the luma component. $E_Y^o(x,y)$ has a maximum magnitude among $|E_Y^v(x,y)|$, $|E_Y^h(x,y)|$, $|E_Y^d(x,y)|$, and $|E_Y^{ad}(x,y)|$.

A gradient direction label unit 23 selects a direction label at an arbitrary point (x, y). This may be represented as shown in equation 4.

$$L_C(x,y) = \text{argmax } |E_{Ck}(x,y)|$$  Equation 4

Here, $k$ represents one of the v, h, d and ad. That is, $L_C(x,y)$ is a direction label, and the $L_C(x,y)$ has one of the v, h, d and ad. v represents vertical, h represents horizontal, d represents diagonal, and ad represents anti-diagonal. C represents a R component, a G component, or a B component.

According to an example embodiment, when RGB components are converted into $YC_bC_r$ components in an image IMG, the gradient direction label unit 23 may select a direction label at an arbitrary point (x,y) by using equation 5.

$$L(p,q) = \text{argmax } |E_Y^o(p,q)|$$  Equation 5

Here, o represents one of the v, h, d and ad. That is, L(p,q) is a direction label and has one of the v, h, d and ad. v represents vertical, h represents horizontal, d represents a diagonal, and ad represents an anti-diagonal. Y represents a luma component. A chroma component $C_b$ or $C_r$ may be used instead of the luma component.

The gradient direction label unit 23 uses a direction label $L_G$ (p, q) of a G component at an initial point (p, q) to determine in which direction a color fringe has occurred. The G component is used as a reference signal among RGB components.

The gradient magnitude unit 21 calculates a maximum gradient magnitude by using equation 6.

$$H((x,y)|(p,q)) = \max\{|E_R(x,y)|, |E_G(x,y)|, |E_B(x,y)|\}$$  Equation 6

A pixel(x, y) is adjacent to an initial point(p, q), and is located according to a direction embodied by a direction label $L_G(p, q)$. $L_G(p, q)$ represents a direction label at an initial point(p, q).

The gradient magnitude $H((x,y)|(p,q))$ has one of $|E_R(x,y)|$, $|E_G(x,y)|$ and $|E_B(x,y)|$. Each of $|E_R(x,y)|$, $|E_G(x,y)|$ and $|E_B(x,y)|$ is a value, calculated by using the equation 2, for each of RGB components.

When $L_G(p,q)=v$, y=q. When $L_G(p,q)=h$, x=p. x and y represent coordinates of a pixel. When $L_G(p,q)=d$, x=p−s and y=q+s. When $L_G(p,q)=ad$, x=p−s and y=q−s. s is a positive number and is related to a left conversion region of an initial point (p,q).

Likewise, when $L_G(p,q)=d$, x=p+t and y=q−s. When $L_G(p,q)=ad$, x=p+t and y=q+t. t is a positive number and is related to a right conversion region of the initial point (p,q).

According to an example embodiment, the gradient magnitude unit 21 may calculate a maximum gradient magnitude by using equation 7.

$$H((x,y)|(p,q)) = \max |E_{Cb}^{L(p,q)}(x,y)|, \{|E_{Cr}^{L(p,q)}(x,y)|\}$$  Equation 7

A pixel(x, y) is adjacent to an initial point (p, q) and is located according to a direction embodied by a direction label L(p, q).

A maximum gradient magnitude $H((x,y)|(p,q))$ has one of $|E_{Cb}^{L(p,q)}(x,y)|$ and $|E_{Cr}^{L(p,q)}(x,y)|$. $|E_{Cb}^{L(p,q)}(x,y)|$ and $|E_{Cr}^{L(p,q)}(x,y)|$ are values, calculated by using the equation 3, for each of chroma components $C_b$ or $C_r$.

When the following equations 8 and 9 are satisfied, respectively, a transition region detection unit 27 determines maximum values of s and t.

$$H((x,y)|(p,q)) \geq T_2$$  Equation 8

$T_2$ represents a threshold value. The transition region detection unit 27 determines if a maximum gradient magnitude $H((x,y)|(p,q))$ is greater than a threshold value $T_2$ $$(L_R(x,y)=L_G(x,y)) \text{ or } (L_R(x,y)=L_B(x,y)) \text{ or } (L_G(x,y)=L_B(x,y))$$  Equation 9

The transition region detection unit 27 compares direction labels of RGB components with each other. That is, the transition region detection unit 27 determines if at least two of direction labels of the RGB components are identical.

Edges occur in several directions in an image IMG, so that a conversion region should be determined according to a gradient direction to detect and correct a color fringe.

The near-saturation region detection unit 25 converts RGB components into a luma component Y in an image IMG.

$$Y = 65.481R + 128.553G + 24.966B + 16$$  Equation 10

The R, G, and B represent RGB components, and have a range from 0 to 1, respectively. The near-saturation region detection unit 25 calculates a boundary NSR' of a dilated near-saturation region $NSR_{dilation}$ in an image IMG as shown in equation 11.

$$NSR = NSR_{Dilation} - NSR$$  Equation 11

NSR represents a near-saturation region, $NSR_{dilation}$ represents a dilated near-saturation region, and NSR' represents a boundary of the dilated near-saturation region.

When a value of Y is greater than or equal to a value of '230', NSR has a value of '1'. When a value of Y is less than a value of '230', NSR has a value of '0'.

The dilated near-saturation region $NSR_{dilation}$ is calculated by using a near-saturation region NSR and a dilation operation of a structuring element.

Figure 3A:
FIG. 3A illustrates a fringed image.
Figure 3B:
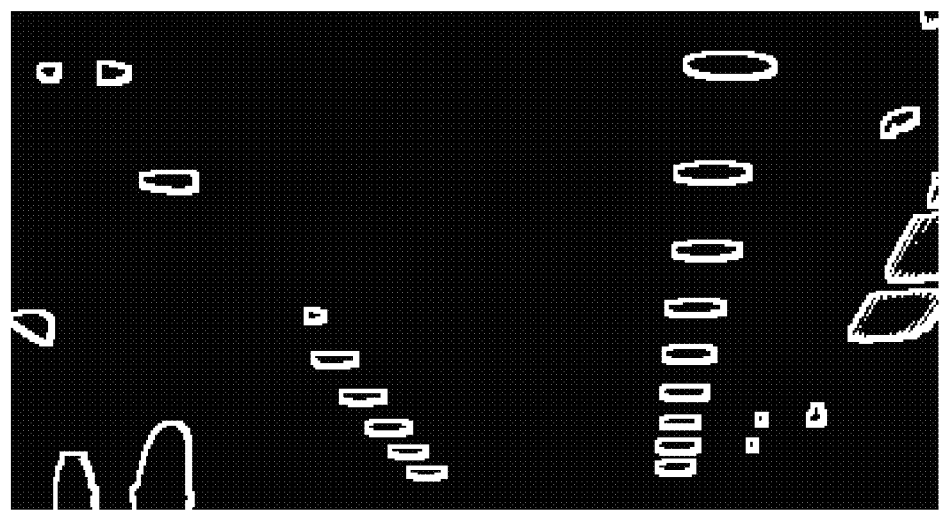
FIG. 3B illustrates a result of detecting a boundary of a near-saturation region of the image illustrated in FIG. 3A.

FIG. 3A illustrates a fringed image and FIG. 3B illustrates a result of detecting a boundary of a near-saturation region of the image illustrated in FIG. 3A.

A boundary NSR' of a near-saturation region is expressed as a white pixel in FIG. 3B. A boundary NSR' of a near-saturation region in the white pixel has a value of '1'. A boundary NSR' of a near-saturation region is a candidate for a color fringe region. A near-saturation region NSR should be considered because of the previously described blooming effect.

Figure 4A:
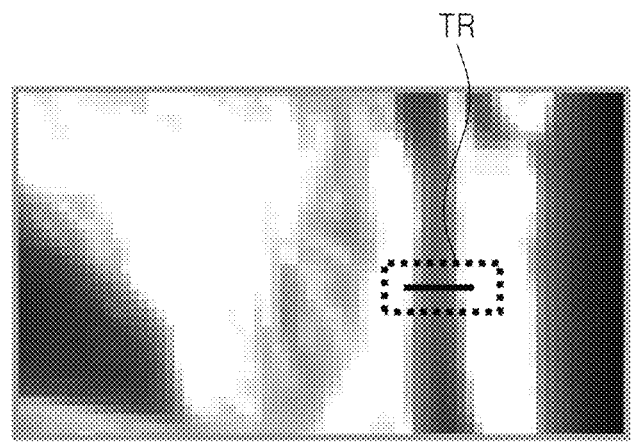
FIG. 4A illustrates a portion of a fringed image.
Figure 4B:
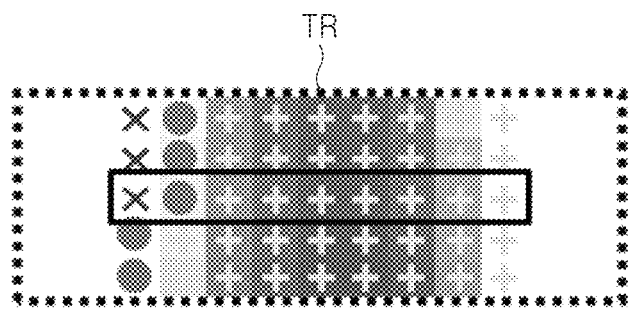
FIG. 4B is an enlarged image of a transition region of the image illustrated in FIG. 4A.

FIG. 4A illustrates a portion of a fringed image, and FIG. 4B is an enlarged image of a transition region TR illustrated in FIG. 4A.

Referring to FIGS. 2, 4A and 4B, a transition region detection unit 27 detects a transition region TR by using a maximum gradient magnitude H((x,y)|(p,q)) calculated by the gradient magnitude unit 21, a direction label $L_G(x,y)$ selected by the gradient direction label unit 23, and a boundary NSR' of a dilated near-saturation region calculated by the near-saturation region detection unit 25.

According to an example embodiment, the transition region detection unit 27 may detect a transition region TR in a $YC_bC_r$ space by using equations 7 and 11.

The transition region TR is expressed as a set of pixels. A pixel Z(p,q) in the transition region TR is represented as shown in equation 12.

A solid black line illustrated in FIG. 4A corresponds to a black box illustrated in FIG. 4B. 'o', 'x', and '+' illustrated in FIG. 4B represent 'p', a left pixel of 'p', and a right pixel of 'p', respectively.

Figure 5A:
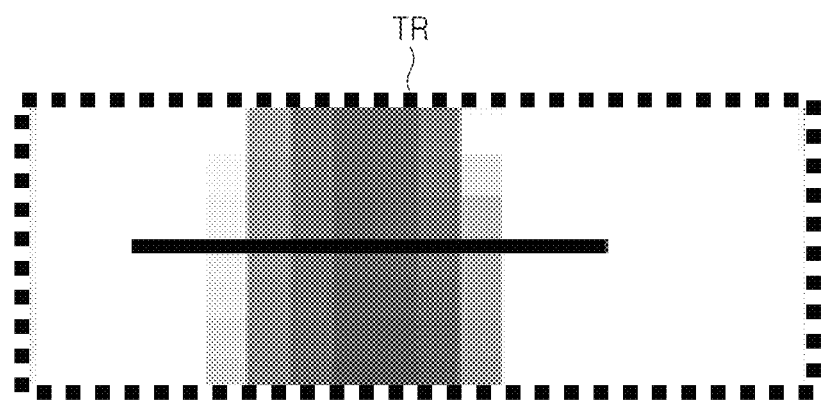
FIG. 5A illustrates a transition region of the image illustrated in FIG. 4B.
Figure 5B:
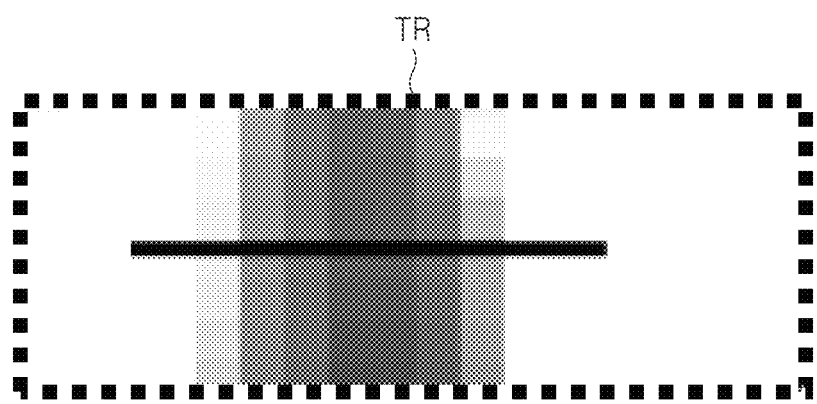
FIG. 5B illustrates a transition region where a fringe is removed using a fringe removal method according to an example embodiment of the inventive concept.
Figure 5C:
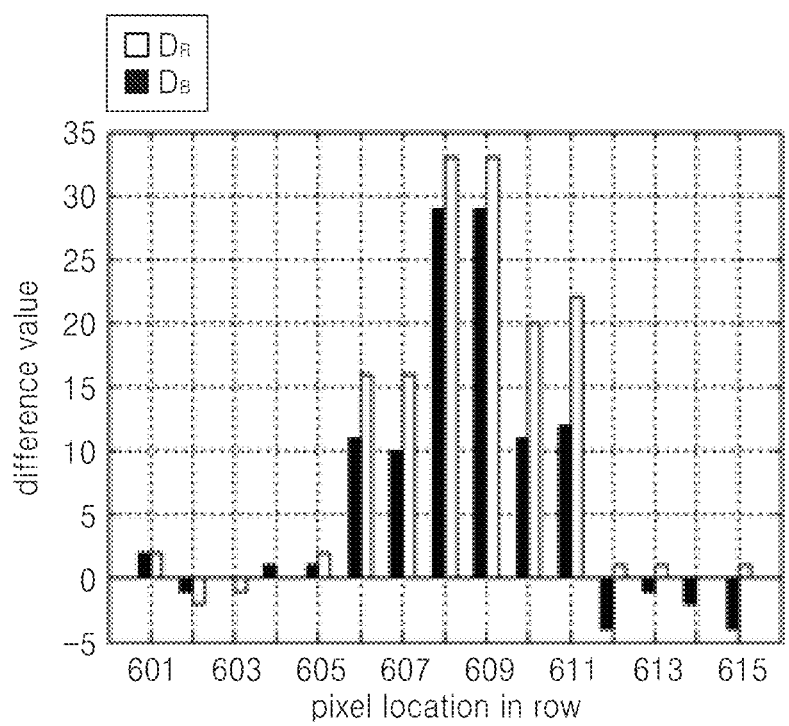
FIG. 5C is a graph depicting color difference values along a solid black line illustrated in FIG. 5A.
Figure 5D:
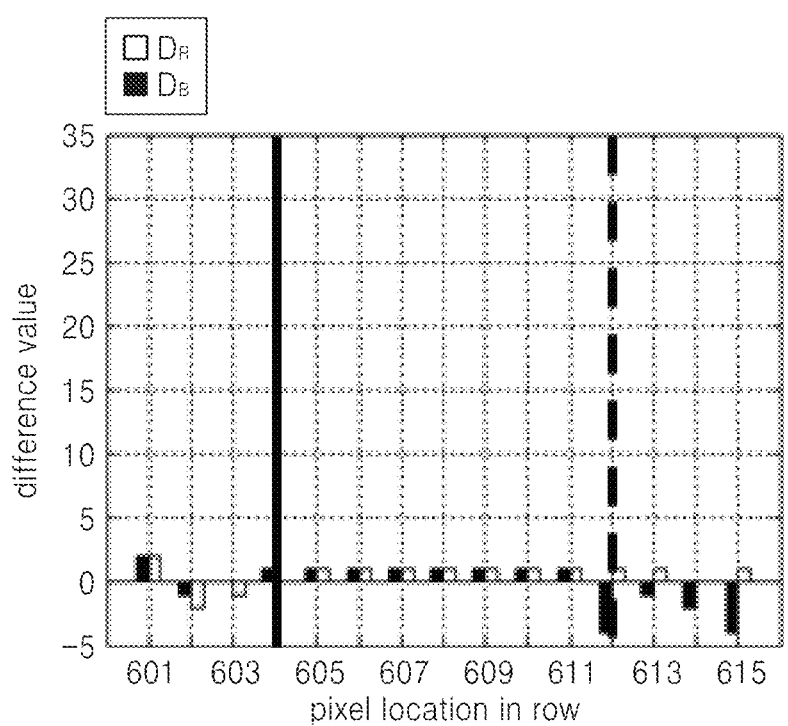
FIG. 5D is a graph depicting color difference values along a solid black line illustrated in FIG. 5A.
Figure 5E:
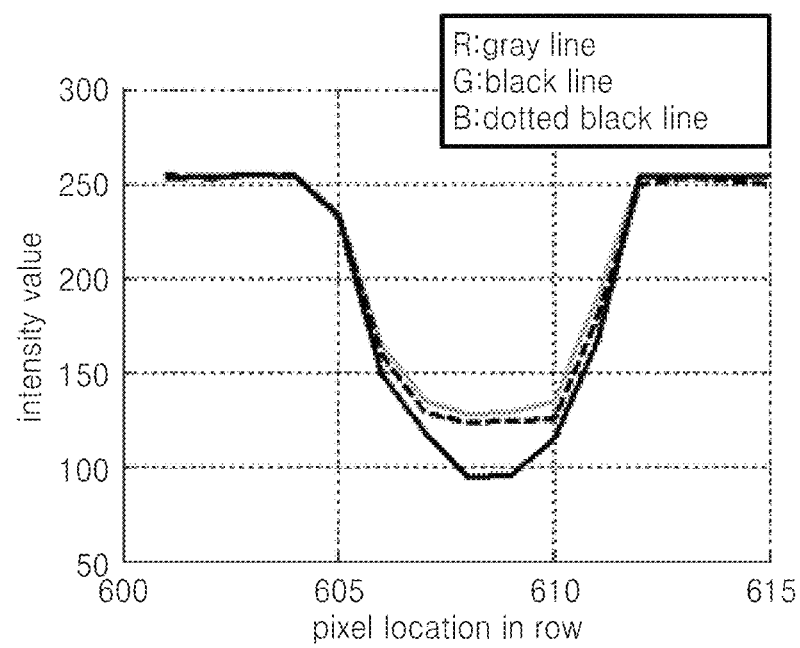
FIG. 5E is a graph depicting an intensity value along a solid black line illustrated in FIG. 5A.
Figure 5F:
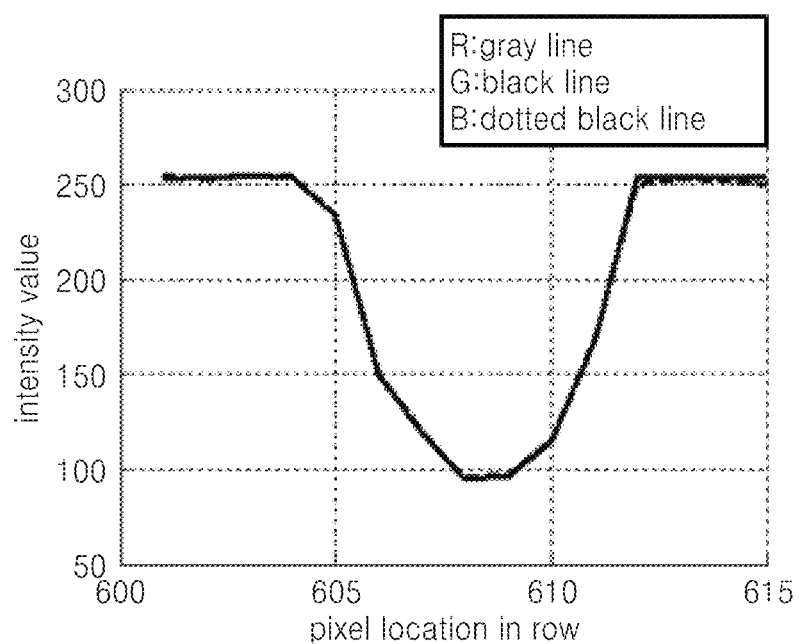
FIG. 5F is a graph depicting an intensity value along a solid black line illustrated in FIG. 5B.

FIG. 5A illustrates a transition region TR illustrated in FIG. 4B, and FIG. 5B illustrates a transition region where a fringe is removed by using a method for removing a fringe according to an example embodiment of the inventive concept. FIG. 5C is a graph depicting color difference values along a solid black line illustrated in FIG. 5A, and FIG. 5D is a graph depicting color difference values along a solid black line illustrated in FIG. 5B. FIG. 5E is a graph depicting an intensity value along a solid black line illustrated in FIG. 5A, and FIG. 5F is a graph depicting an intensity value along a solid black line illustrated in FIG. 5B.

$$Z(p, q) = \begin{cases} \{(i, j) \mid p - S < i < p + T, j = q\}, & \text{if } L_G(p, q) = v \\ \{(i, j) \mid i = p, q - S < j < q + T\}, & \text{if } L_G(p, q) = h \\ \{(i, j) \mid p - S < i < p + T, q - T < j < q + S\}, & \text{if } L_G(p, q) = d \\ \{(i, j) \mid p - S < i < p + T, q - S < j < q + T\}, & \text{if } L_G(p, q) = ad \end{cases} \quad \text{Equation 12}$$

When a value of $L_G$ (p,q), NSR'=1, and a condition of the equations 4 and 5 are satisfied, a pixel Z(p,q) is determined S and the T represent a leftmost location and a rightmost location in the transition region TR, respectively. That is, S and the T represent a maximum value of the positive number s and the positive number t, respectively. i and j represent coordinates of an image illustrated in FIG. 4A.

Since a part of an image illustrated in FIG. 4A is $L_G(p,q)=v$, a pixel Z(p,q) in the transition region TR is {(i,j)|p–S<i<p+T, j=q}.

Leftmost pixel coordinates and rightmost pixel coordinates in the transition region TR are defined as l(p,q) and r(p,q), respectively. l(p,q) and r(p,q) according to a gradient direction label are represented as shown in table 1.

TABLE 1

| $L_G$ (P,q) | l (p,q) | r (p,q) |
| --- | --- | --- |
| V | (p − S,q) | (p + T,q) |
| H | (p,q − S) | (p,q + T) |
| D | (p − S,q + S) | (p + T,q − T) |
| Ad | (p − S,q − S) | (p + T,q + T) |

Referring to FIGS. 5A and 5C, leftmost pixel coordinates l(p,q) are for a $604^{th}$ pixel, and rightmost pixel coordinates r(p,q) are for a $612^{th}$ pixel. A white bar represents a color difference value $D_g$ between a R color element and a G color element, and a black bar represents a color difference value $D_B$ between a B color element and a G color element.

When a color fringe occurs in the transition region TR, color difference values in the transition region TR are not within a range of color difference values at leftmost pixel coordinates l(p,q) and rightmost pixel coordinates r(p,q). At the leftmost pixel coordinates l(p,q), a color difference value $D_R$ is 0 and a color difference value $D_B$ is 1. At rightmost pixel coordinates r(p,q), a color difference value $D_R$ is 1 and a color difference value $D_B$ is −4. That is, color difference values in a transition region TR are not between −4 and 1.

Accordingly, the correction block 30 may correct or remove a color fringe in the transition region TR by using a maximum value (0 when a color difference value is Dr, 1 when a color difference value is $D_B$) and a minimum value (0 when a color difference value is $D_R$, −4 when a color difference value is $D_B$) of color difference at pixel coordinates l(p,q) and r(p,q). In addition, the correction block 30 may correct or remove a color fringe by using an intensity value of a G component in each pixel of the transition region TR. This may be represented with equations 13 through 15.

$$\hat{R}(x, y) = \begin{cases} \min\{D_R(l(p, q)), D_R(r(p, q))\} + G(x, y), & \text{if } D_R(x, y) < \min\{D_R(l(p, q)), D_R(r(p, q))\} \\ \max\{D_R(l(p, q)), D_R(r(p, q))\} + G(x, y), & \text{if } D_R(x, y) > \max\{D_R(l(p, q)), D_R(r(p, q))\} \\ R(x, y), & \text{otherwise} \end{cases} \quad \text{Equation 13}$$

$$\hat{B}(x, y) = \begin{cases} \min\{D_B(l(p, q)), D_B(r(p, q))\} + G(x, y), & \text{if } D_B(x, y) < \min\{D_B(l(p, q)), D_B(r(p, q))\} \\ \max(D_B(l(p, q)), D_B(r(p, q))) + G(x, y), & \text{if } D_B(x, y) > \max\{D_B(l(p, q)), D_B(r(p, q))\} \\ B(x, y), & \text{otherwise} \end{cases} \quad \text{Equation 14}$$

$$\hat{G}(x, y) = \hat{G}(x, y) \quad \text{Equation 15}$$

Each of $\hat{R}(x,y)$, $\hat{G}(x,y)$ and $\hat{B}(x,y)$ represents each of R, G and B color outputs in a corrected image. $D_R(l(p,q))$ represents a color difference value between a R color element and a G color element at leftmost pixel coordinates, $D_R(r(p,q))$ represents a color difference value between a R color element and a G color element at rightmost pixel coordinates, $D_B(l(p,q))$ represents a color difference value between a B color element and a G color element at leftmost pixel coordinates, and $D_B(r(p,q))$ represents a color difference value between a B color element and a G color element at rightmost pixel coordinates. (x,y) represents an element of a pixel Z(p,q) in the transition region TR.

The correction block 30 corrects a color fringe according to a direction embodied by a direction label LG(p,q) of a G component.

Referring to FIGS. 5A and 5E, intensity values of R, G and B in the transition region TR have different gradients.

Referring to FIGS. 5B and 5D, after a color fringe is removed from the transition region TR, color difference values in the transition region TR are located between color difference values at leftmost pixel coordinates l(p,q) and rightmost pixel coordinates r(p,q). A solid black line represents the leftmost pixel coordinates l(p,q) and a dotted black line represents the rightmost pixel coordinates r(p,q) in FIG. 5D.

Referring to FIGS. 5B and 5F, intensity values of R, G, and B in a transition region TR have the same gradient.

Figure 6:
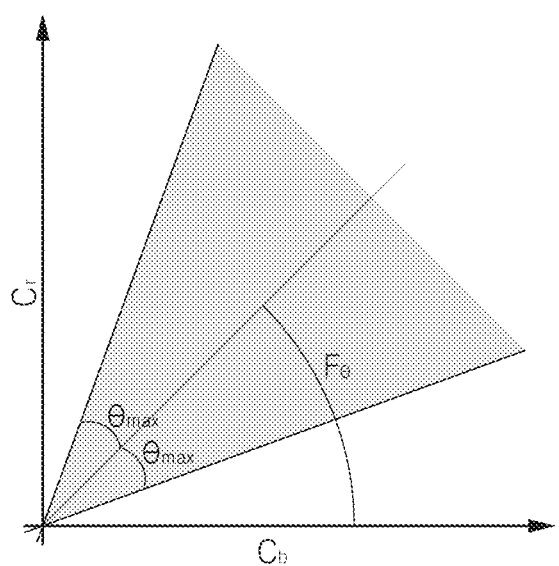
FIG. 6 is diagram representing a purple color fringe region in a $C_b C_r$ plane.

FIG. 6 is a purple color fringe region on a $C_bC_r$ plane. Referring to FIGS. 2 and 6, the correction block 30 may remove a color fringe by using values of chroma components $C_b$ and $C_r$ and a direction label L(p,q) according to equation 5. The correction block 30 may calculate the degree of color fringe occurrence by using equation 16 in a detected transition region.

$$PD(x,y) = \frac{\theta_{max} - \min(|F_\theta - \theta(x,y)|, \theta_{max})}{\theta_{max}} \quad \text{Equation 16}$$

The PD(x,y) represents the degree of a purple color fringe, $\theta(x,y)$ represents a hue value, $F_\theta$ and $\theta_{max}$ represent a hue center and a hue angle, respectively. $\theta(x,y)$ has a range between $-180°$ and $180°$. A color fringe region in FIG. 6 is defined as a region having a range between $F_\theta - \theta_{max}$ and $F_\theta + \theta_{max}$. The degree of the color fringe occurrence PD(x,y) has a range between 0 and 1. When a hue value $\theta(x,y)$ is located outside the color fringe region, a pixel corresponding to the hue value is determined as a non-color fringe pixel.

As the degree of color occurrence PD(x,y) increases, a color fringe region increases.

The correction block 30 calculates the degrees of color fringe occurrence for each of red, green, blue and purple color fringes by using the equation 16. The degrees of color fringe for each color fringe RD(x,y), GD(x,y), BD(x,y), and PD(x,y) may be calculated by using parameter values of table 2.

TABLE 2

| Type of Color Fringe | $F_\theta$ | $\theta_{max}$ |
|---|---|---|
| Purple | 59.56° | 41.09° |
| Red | 99.78° | 12.18° |
| Green | -115.07° | 49.97° |
| Blue | -34.43° | 28.50° |

The correction block 30 determines a color degree CD(x,y) by using equation 17. That is, the correction block 30 determines a greatest value among the degrees of color fringe occurrence for each of red, green, blue and purple color fringes as a color degree CD(x,y).

$$CD(x,y) = \max\{RD(x,y), GD(x,y), BD(x,y), PD(x,y)\} \quad \text{Equation 17}$$

RD(x,y), GD(x,y), BD(x,y), and PD(x,y) represent the degree of color fringe occurrence for each of red, green, blue and purple color fringes, respectively.

The correction block 30 calculates a saturation value SAT by using equation 18 to correct values of chroma components $C_b$ and $C_r$.

$$SAT(i,j) = \sqrt{(C_b(i,j)-128)^2 + (C_r(i,j)-128)^2} \quad \text{Equation 18}$$

Each of $C_b(i,j)$ and $C_r(i,j)$ is a value of chroma components Cb and Cr at a pixel (i,j) in a transition region. When the saturation value has a high value, a pixel value corresponding to the saturation value is included in a near saturation region NSR. As a color degree CD and a saturation value gets smaller, values of chroma components $C_b$ and $C_r$ get greater in correction of color fringe.

The correction block 30 calculates a hue value $\theta(x,y)$ to determine weight values for correcting values of chroma components $C_b$ and $C_r$ in a color fringe region. An example of calculation of the hue value $\theta(x,y)$ is explained in detail in U.S. Pat. No. 7,529,405.

The correction block 30 corrects chrominance values by using equation 19.

$$C'(x,y) = \frac{\sum_{m=-M}^{M}(W_{i,j}C(i,j))}{\sum_{m=-M}^{M} W_{i,j}} \quad \text{Equation 19}$$

C'(x,y) is corrected chrominance values, and C'(x,y) represents a value of a chroma component $C_b$ or $C_r$ in an image IMG. M represents the number of neighboring pixels according to a direction label. $W_{i,j}$ represents weight values of each pixel, and weight values $W_{i,j}$ of each pixel may be calculated by using a color degree CD and a saturation value SAT. This is expressed in equation 20.

$$W_{i,j} = (127 - SAT(i,j)+1)(1-CD(i,j)+1) \quad \text{Equation 20}$$

Figure 7:
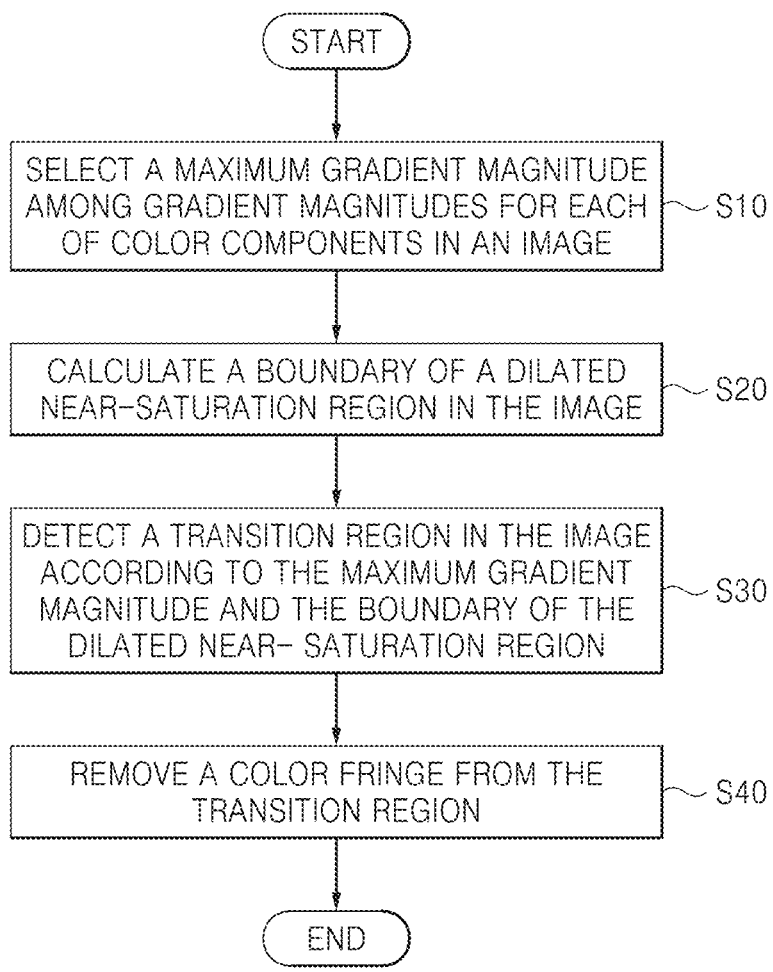
FIG. 7 is a flowchart for explaining a color fringe removal method according to an example embodiment of the inventive concept.

FIG. 7 is a flowchart for explaining a method for removing a color fringe according to an example embodiment of the present inventive concept. Referring to FIGS. 2, 5A through 5F, and 7, the gradient magnitude unit 21 selects a maximum gradient magnitude H((x,y)|(p,q)) among gradient magnitudes $|E_R(x,y)|$, the $|E_G(x,y)|$ and the $|E_B(x,y)|$ of each of color components in an image IMG (S10).

The near-saturation region detection unit 25 calculates a boundary NSR'(x,y) of a dilated near-saturation region $NSR_{Dilation}$ in an image IMG (S20). The transition region detection unit 27 detects a transition region TR in an image IMG according to the maximum gradient magnitude and a boundary of the dilated near-saturation region (S30). The correction block 30 removes a color fringe from a transition region TR (S40).

Figure 8:
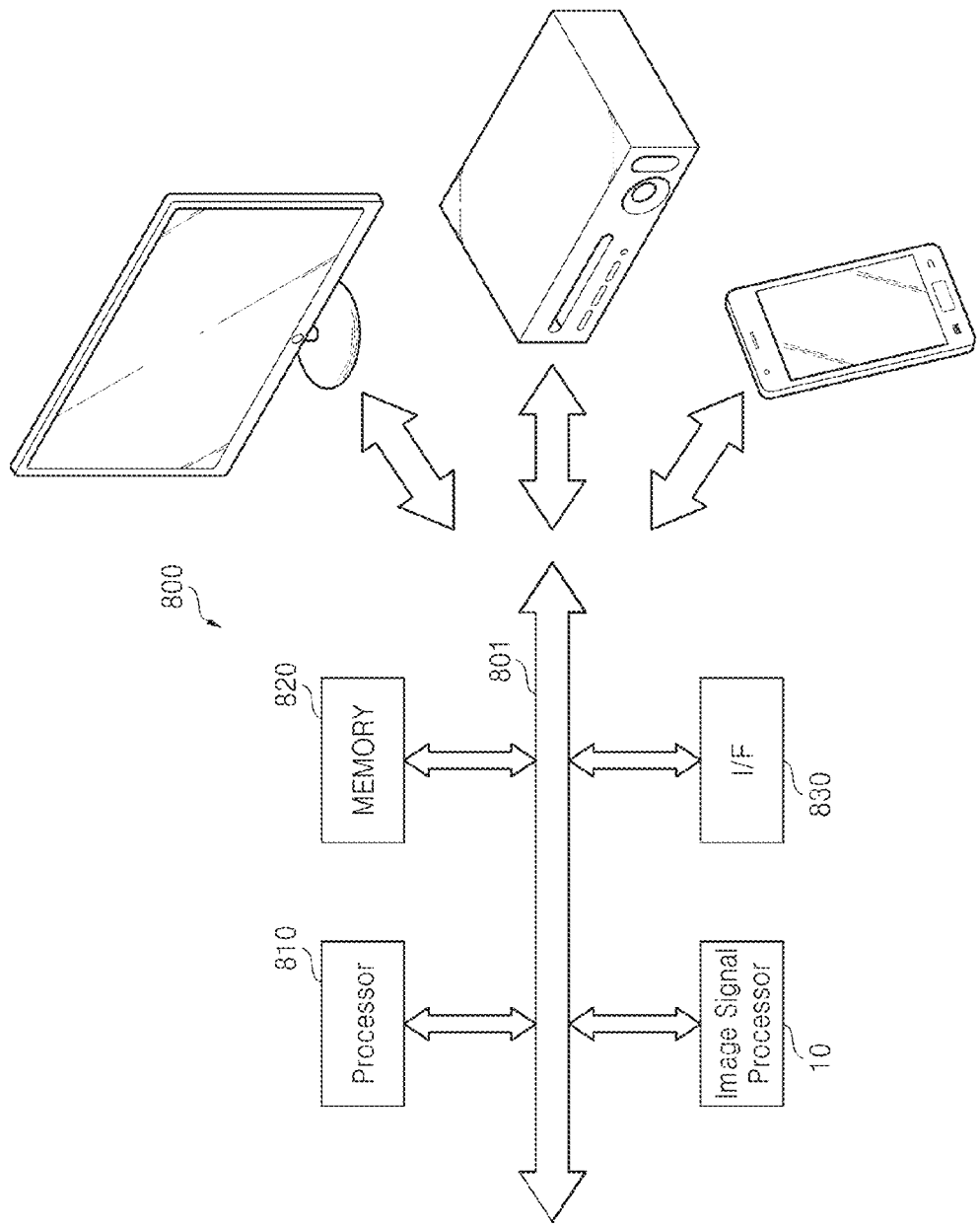
FIG. 8 is a block diagram of an example embodiment of a system including the image processor illustrated in FIG. 2.

FIG. 8 is a block diagram of an example embodiment of a system including the image processor illustrated in FIG. 2. Referring to FIGS. 2 and 8, a system 800 includes the image signal processor 10, a processor 810, a memory 820 and an interface (I/F) 830, all communicating over a bus system 801.

The processor 810 performs instructions for controlling the components 10, 820 and 830. The memory 820 may store instructions performed by the processor 810 and/or an image IMG processed by the image signal processor 10. The interface 830 may be embodied in an interface for outputting an image processed by the image signal processor 10. According to an example embodiment, the interface 830 may be embodied in a wireless interface.

As schematically represented in FIG. 8, system 800 may be embodied, as examples, in a mobile phone, a smart phone, a tablet PC, a personal digital assistant (PDA), an enterprise digital assistant (EDA), a digital still camera, a digital video camera, a portable multimedia player (PMP), a personal navigation device or portable navigation device (PDN), a smart TV, handheld game console, a security camera, or an e-book.

Figure 9:
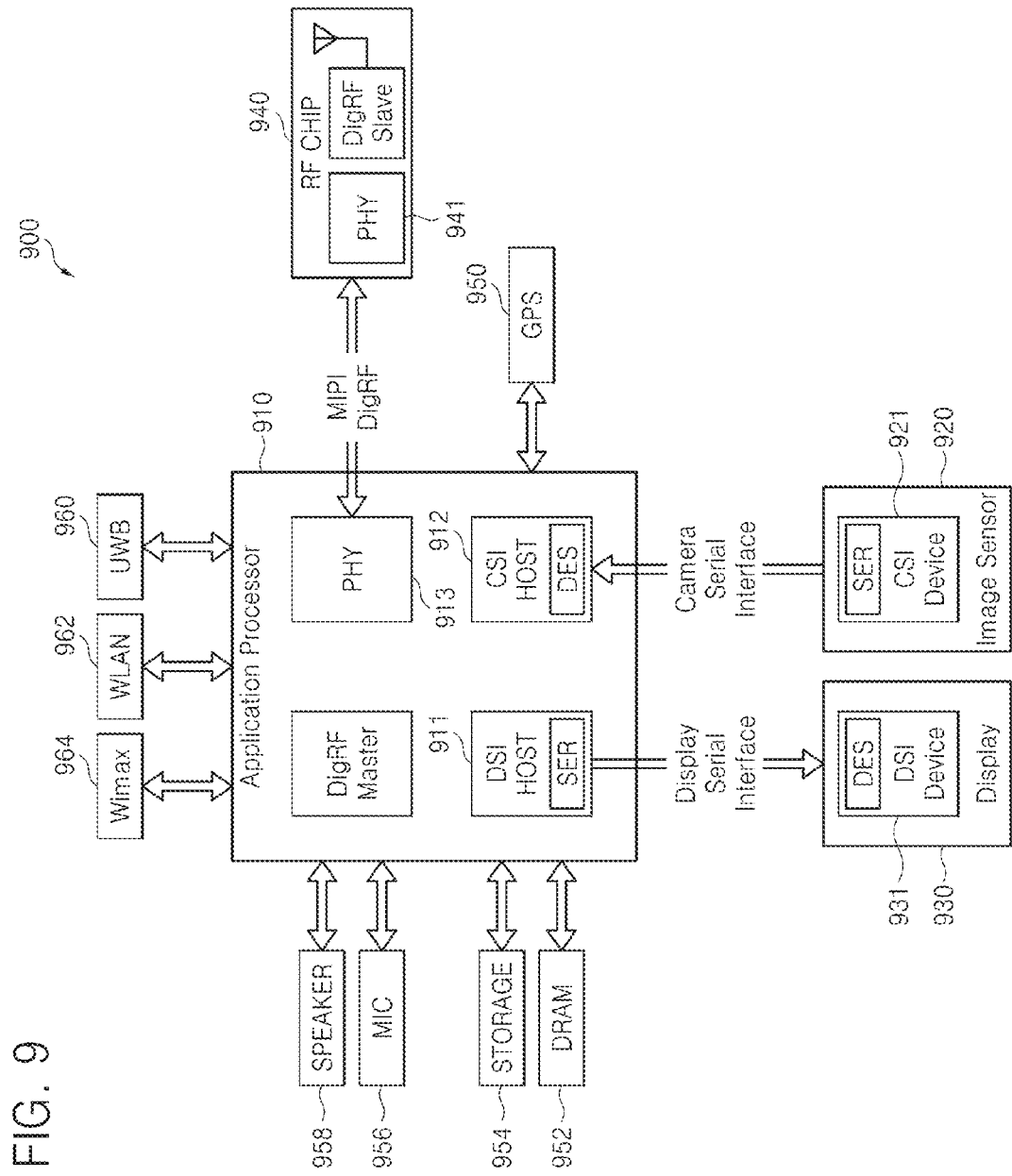
FIG. 9 is a block diagram of another example embodiment of a system including the image processor illustrated in FIG. 2.

FIG. 9 is a block diagram of another example embodiment of the system including the image processor illustrated in FIG. 2. Referring to FIG. 9, a system 900 may be embodied in an image processing device which may use or support a mobile industry processor interface (MIPI®), e.g., a portable device such as a personal digital assistant (PDA), a portable media player (PMP), a mobile phone, a smart phone, or a tablet PC.

The system 900 includes an application processor 910, an image sensor 920 and a display 930. The application processor 910 may include the image signal processor 10 illustrated in FIG. 2. A camera serial interface (CSI) host 912 embodied in the application processor 910 may perform a serial communication with a CSI device 921 of the image sensor 920. According to an example embodiment, a de-serializer (DES) may be embodied in the CSI host 912, and a serializer SER may be embodied in the CSI device 921.

A display serial interface (DSI) host 911 embodied in the application processor 910 may perform a serial communication with a DSI device 931 of the display 930 through a display serial interface. According to an example embodiment, a serializer SER may be embodied in the DSI host 911, and a de-serializer DES may be embodied in the DSI device 931. The system 900 may further include a RF chip 940 which may communicate with the application processor 910. A PHY 913 of the system 900 may transmit or receive data to/from a PHY 941 of the RF chip 940 according to MIPI DigRF.

The system 900 may include a GPS receiver 950, a memory 952 such as a dynamic random access memory (DRAM), a data storage device 954 embodied in a non-volatile memory like a NAND flash memory, a microphone 956 or a speaker 958. In addition, the system 900 may communicate with an external device by using at least one communication protocol or communication standard, e.g., ultra-wideband (UWB) 960, Wireless LAN(WLAN) 962, worldwide interoperability for microwave access (WiMAX) 964, or long term evolution (LTE™:not shown).

As described above, a method and a device for removing a color fringe according to example embodiments of the inventive concept may process an image to detect and remove a color fringe of the image.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image processing method, comprising:
an image processor selecting a maximum gradient magnitude among gradient magnitudes for each of a plurality of color components of an image;
the image processor calculating a boundary of a dilated near-saturation region in the image;
the image processor detecting a transition region in the image according to the maximum gradient magnitude and the boundary of the dilated near-saturation region; and
the image processor removing a color fringe from the transition region to obtain a processed image.

2. The method of claim 1, wherein each of the gradient magnitudes for each of the color components represents a greatest value among gradient magnitudes, calculated by using each of vertical, horizontal, diagonal and anti-diagonal sobel masks, for each of the color components.

3. The method of claim 1, further comprising selecting a direction label for at least one of the color components at an arbitrary point of the image, wherein the direction label is used to detect the transition region.

4. The method of claim 3, wherein the direction label is one of v, h, d and ad, and wherein v represents vertical, h represents horizontal, d represents diagonal, and ad represents anti-diagonal.

5. The method of claim 1, wherein a boundary value of the dilated near-saturation region in the detected transition region is 1.

6. The method of claim 1, wherein the maximum gradient magnitude is greater than a threshold value in the detected transition region.

7. The method of claim 3, wherein, when each of direction labels is selected for each of the color components, at least two of the direction labels for each of the color components are the same in the detected transition region.

8. The method of claim 1, wherein calculating a boundary of a dilated near-saturation region in the image includes:
calculating a near-saturation region by comparing a luma component value with a threshold value in the image;
calculating a dilated near-saturation region by using the near-saturation region and a dilation operation of a structuring element; and
calculating a boundary of the dilated near-saturation region using difference between the near-saturation region and the dilated near-saturation region.

9. The method of claim 1, wherein removing a color fringe in the transition region includes:
calculating leftmost pixel coordinates and rightmost pixel coordinates in the transition region according to the maximum gradient magnitude; and
removing a color fringe from the transition region by using a maximum value and a minimum value of a color difference at the leftmost pixel coordinates and the rightmost pixel coordinates.

10. The method of claim 1, wherein removing a color fringe from the transition region includes:
calculating a degree of color fringe occurrence for each color fringe in the transition region;
determining a greatest value among the degrees of the color fringe occurrence as a color degree;
calculating a saturation value by using values of chroma components in the image;
calculating weight values of each pixel in the transition region by using the color degree and the saturation value; and
correcting the chroma components by using the weight values of each pixel.

11. An image processing method, comprising:
an image processor receiving a digital image signal including a plurality of color components for each of plural pixels constituting an image frame;

the image processor selecting a maximum gradient magnitude among gradient magnitudes for each of the color components of the image frame;

the image processor calculating a boundary of a dilated near-saturation region in the image frame;

the image processor detecting a transition region in the image frame according to the maximum gradient magnitude and the boundary of the dilated near-saturation region;

the image processor generating a processed digital image signal in which a color fringe from the transition region has been removed.

12. The method of claim 11, wherein each of the gradient magnitudes for each of the color components represents a greatest value among gradient magnitudes, calculated by using each of vertical, horizontal, diagonal and anti-diagonal sobel masks, for each of the color components.

13. The method of claim 11, further comprising selecting a direction label for at least one of the color components at an arbitrary point of the image, wherein the direction label is used to detect the transition region.

14. The method of claim 13, wherein the direction label is one of v, h, d and ad, and wherein v represents vertical, h represents horizontal, d represents diagonal, and ad represents anti-diagonal.

15. An image processor, comprising:
a gradient magnitude unit for selecting a maximum gradient magnitude among gradient magnitudes for each of a plurality of color components in an image;
a near-saturation region detection unit for calculating a boundary of a dilated near-saturation region in the image;
a transition region detection unit for detecting a transition region in the image according to the maximum gradient magnitude and the boundary of the dilated near-saturation region; and
a correction block for removing a color fringe from the transition region.

16. The image processor of claim 15, further comprising a gradient direction label unit for selecting a direction label for at least one of the color components at an arbitrary point in the image.

17. The image processor of claim 15, wherein the correction block calculates leftmost pixel coordinates and rightmost pixel coordinates of the transition region according to the maximum gradient magnitude, and removes the color fringe from the transition region by using a maximum value and a minimum value of a color difference at the leftmost pixel coordinates and the rightmost pixel coordinates.

18. The image processor of claim 15, wherein the correction block calculates a degree of color fringe occurrence for each color fringe in the transition region, determines a greatest value among the degrees of color fringe occurrence as a color degree, calculates a saturation value by using values of chroma components in the image, calculates weight values of each pixel in the transition region by using the color degree and the saturation value, and corrects the chroma components by using the weight values of each pixel.

19. A system comprising the image processor of claim 15, a host processor, a memory and interface communicating over a bus system.

20. The system of claim 19, wherein the system is embodied as at least one of a mobile phone, a smart phone, a tablet PC, a personal digital assistant (PDA), an enterprise digital assistant (EDA), a digital still camera, a digital video camera, a portable multimedia player (PMP), a personal navigation device or portable navigation device (PDN), a smart TV, handheld game console, a security camera, and an e-book.

* * * * *